United States Patent [19]
Suzuki et al.

[11] Patent Number: 5,871,064
[45] Date of Patent: Feb. 16, 1999

[54] POWER STEERING APPARATUS

[75] Inventors: Katsuhiro Suzuki; Shinichi Hagidaira; Yoshiyuki Tsukada, all of Kani, Japan

[73] Assignee: Kayaba Industry Co., Ltd., Tokyo, Japan

[21] Appl. No.: 889,401

[22] Filed: Jul. 8, 1997

[30] Foreign Application Priority Data

Jul. 10, 1996 [JP] Japan ................................. 8-199726
May 7, 1997 [JP] Japan ................................. 9-132855

[51] Int. Cl.⁶ .................................................. B62D 15/00
[52] U.S. Cl. ......................................... 180/400; 180/444
[58] Field of Search .............................. 180/444, 417, 180/425, 426, 400

[56] References Cited

U.S. PATENT DOCUMENTS

| | | | |
|---|---|---|---|
| 2,855,789 | 10/1958 | Von Thungen | 180/400 |
| 4,458,795 | 7/1984 | Norton | 180/444 |
| 4,901,831 | 2/1990 | Ito et al. | 180/444 |
| 5,010,970 | 4/1991 | Yamamoto | 180/444 |
| 5,251,669 | 10/1993 | Bishop | 137/625.23 |
| 5,390,755 | 2/1995 | Joerg et al. | 180/426 |

FOREIGN PATENT DOCUMENTS 3139470 6/1991 Japan.
6171520 6/1994 Japan.

*Primary Examiner*—Anne Marie Boehler
*Assistant Examiner*—Michael Cuff
*Attorney, Agent, or Firm*—Steinberg & Raskin, P.C.

[57] ABSTRACT

A power steering apparatus having enhanced neutral rigidity and improved operation stability at the time of straight traveling. The apparatus includes a pair of spring members which sandwich an input shaft and are disposed in an output shaft or a member rotating integrally with this output shaft. A preset force is exerted by a spring force of the spring members.

14 Claims, 8 Drawing Sheets

POWER STEERING APPARATUS

BACKGROUND OF THE INVENTION

1. Field of the Invention

This invention relates to a power steering apparatus utilizing a torsion bar.

2. Description of the Prior Art

In conventional power steering apparatus utilizing a torsion bar, it is so constructed that a feeling from a steering wheel is determined by a torsion resistance of this torsion bar. However, when the steering wheel is in its neutral position, there occurs little torsion resistance in the torsion bar, therefore its neutral rigidity becomes weak.

Thus, various types of apparatuses for enhancing the neutral rigidity have been proposed. For example, apparatuses disclosed in Japanese Patent Application Laid-Open No.Hei6-171520 and Hei3-139470 have been well known since before.

In the apparatus disclosed in Japanese Patent Application Laid-Open No.Hei6-171520, the input shaft is inserted into the output shaft so that a space is formed between both the shafts, and a ring-shaped spring is incorporated in this space. This spring is formed by cutting one position of the material and can be opened to the right and left from that cut position. Then, pins are protruded to both sides, the input shaft side and the output shaft side, and the respective pins are inserted into the cut positions of the above spring members.

If the input shaft and the output shaft are rotated relative to each other with the above condition, the ring-shaped spring members are opened from the cut positions. Reaction of the spring which occurs when they are opened acts as a preset force to enhance the neutral rigidity.

In the apparatus disclosed in Japanese Patent Application Laid-Open No.Hei3-139470, the input shaft is inserted into the output shaft and protrusions are formed on portions opposing each other of both the shafts. A spring force of the leaf spring is applied to these protrusions in such a condition that they are nipped.

If both the shafts are rotated relative to each other, the protrusions go contradictorily. When the protrusion are contradictory to each other, a spring force of the leaf spring acts. A preset force is exerted by this spring force.

The invention disclosed in the above Japanese Patent No.Hei6-171520 has such a problem that the spring force of the ring-shaped spring member cannot be specified easily.

Further, if its preset force is intended to increase, a deflection amount initially set must be increased. However, if the deflection amount initially set is increased, the spring members must be assembled at a predetermined position in such a condition that they are largely deflected. Assembly of the spring members in the deflection state worsens the assembly performance thereof.

On the contrary, if the amount of deflection initially set is decreased, the spring constant must be increased correspondingly. If the spring constant is increased, spring stress is increased correspondingly so that the spring may be broken in normal application range.

In the invention disclosed in Japanese Patent Application Laid-Open No.Hei3-139470, if the protrusions on both the shafts are not set symmetrically, preset force is deviated or looseness occurs. However, if it is intended to arrange them symmetrically, quite high an accuracy is needed, and therefore productivity of this product is reduced.

SUMMARY OF THE INVENTION

Accordingly, an object of the present invention is to provide a power steering apparatus excellent in assembly performance and productivity.

According to a first aspect of the present invention, there is provided a power steering apparatus comprising an input shaft connected to a steering wheel side, an output shaft connected to wheels to be steered and a torsion bar connecting the input shaft and the output shaft and making the input shaft and the output shaft rotate relative to each other while twisting the torsion bar so as to apply an assist force corresponding to an amount of the relative rotation, wherein a pair of spring members which sandwich both sides of the input shaft are disposed within the output shaft or a member rotating integrally with the output shaft so as to exert a preset force by means of spring force of the spring members.

According to a second aspect of the present invention, there is provided a power steering apparatus wherein flat faces are formed on both sides of the input shaft and flat portions are formed on the spring members corresponding to the flat faces of the input shaft such that the flat faces and the flat portions are firmly in contact with each other.

According to a third aspect of the present invention, there is provided a power steering apparatus wherein oblique faces are formed on both sides of the flat faces of the input shaft.

According to a fourth aspect of the present invention, there is provided a power steering apparatus wherein the spring members comprise leaf springs the central portion of which is swollen toward the input shaft side.

According to a fifth aspect of the present invention, there is provided a power steering apparatus wherein curved faces having a curvature radius larger than other circumferences thereof are formed on the input shaft while the spring members are made into a firm contact with the curved faces.

According to a sixth aspect of the present invention, there is provided a power steering apparatus wherein a spring storing chamber is formed in the output shaft or a member rotating integrally with the output shaft and the input shaft is inserted into the spring storing chamber while spring members are disposed in gaps between both ends of the input shaft and wall faces of the spring storing chamber.

According to a seventh aspect of the present invention, there is provided a power steering apparatus wherein the spring members comprise flat leaf springs and both ends of the leaf springs are inserted into slit grooves formed in wall face of the spring storing chamber so that the leaf springs are firmly in contact with both sides of the input shaft.

According to an eighth aspect of the present invention, there is provided a power steering apparatus wherein the spring members comprise wire material such as piano wire and both ends of the wire material are inserted into insertion holes formed in the wall faces of the spring storing chamber so that the wire material is firmly in contact with both sides of the input shaft.

According to a ninth aspect of the present invention, there is provided a power steering apparatus wherein the spring members comprise leaf springs having a trapezoidal cross section and flat portions are formed on top thereof so that both end portions thereof are firmly in contact with the wall faces of the spring storing chamber.

According to a tenth aspect of the present invention, there is provided a power steering apparatus wherein both ends of the leaf springs are curled and the curled portions are firmly in contact with corners in the spring storing chamber.

According to an eleventh aspect of the present invention, there is provided a power steering apparatus wherein a detente mechanism is provided between the spring member and input shaft, the detente mechanism being so structured that a protrusion provided on the spring member coincides with a groove formed in the input shaft in the neutral position.

According to a twelfth aspect of the present invention, there is provided a power steering apparatus wherein balls or roller are held in the spring members, the balls or the rollers having protrusions.

According to a thirteenth aspect of the present invention, there is provided a power steering apparatus wherein the spring storing chamber is formed in the output shaft or a member rotating integrally with the output shaft and hooking portions are provided on both ends of the spring members such that the hooking portions are made into a firm contact with corner portions of the spring storing chamber.

According to a fourteenth aspect of the present invention, there is provided a power steering apparatus wherein fixing portions are formed at both ends of the spring members and the fixing portions are fixed to the output shaft or the member rotating integrally with the output shaft by means of the fixing means.

DETAILED DESCRIPTION OF THE PREFERRED EMBODIMENTS

Figure 1:
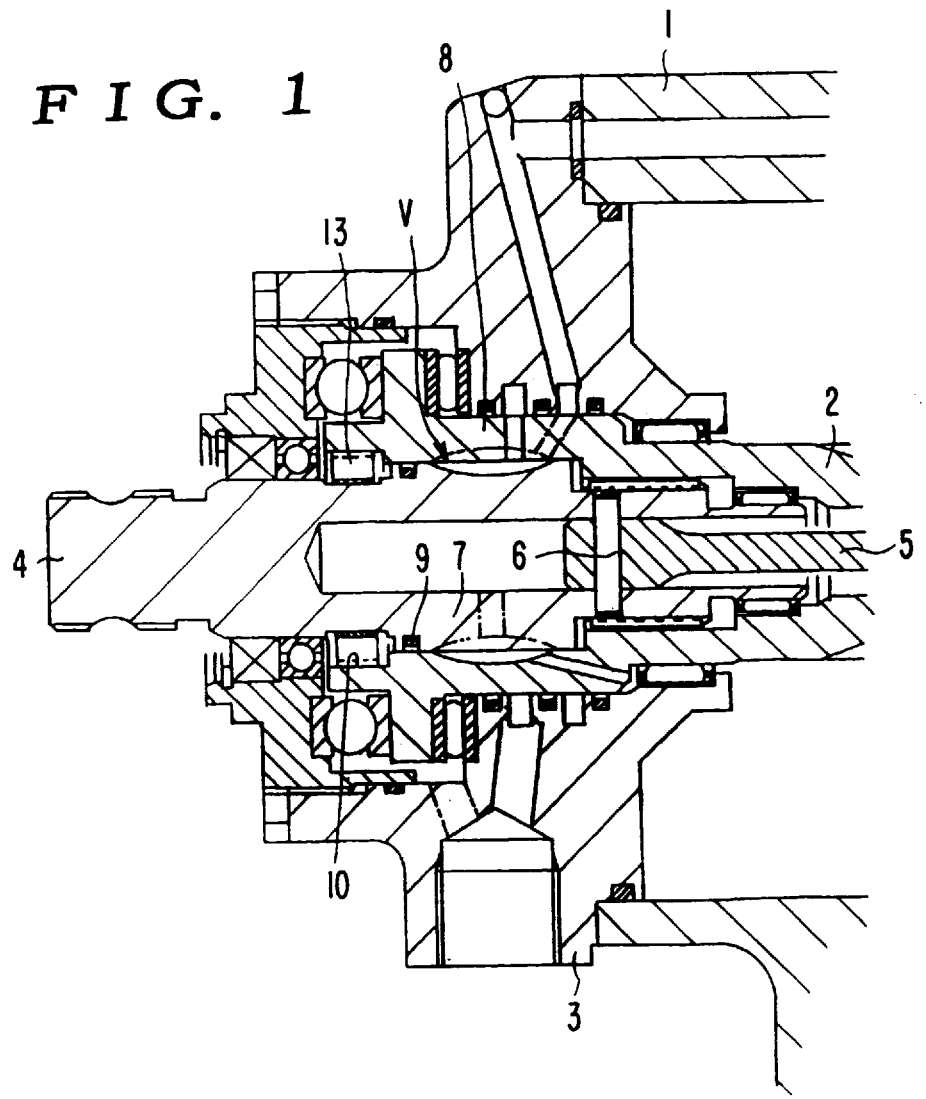
FIG. 1 is a sectional view of major parts of a first embodiment.

According to a first embodiment shown in FIGS. 1–4, a piston (not shown) is incorporated in a power cylinder 1 such that this piston runs through an output shaft 2. This piston and the output shaft 2 are interconnected with each other through a ball nut. A sector gear (not shown) is mounted on this piston such that the sector gear is rotated by a traveling of the piston. If the sector gear is rotated, a steering wheel interconnected thereto is steered. This is so-called integral type power steering apparatus.

A valve case 3 is fixed to the above power cylinder 1. This valve case 3 supports a proximal end of the above output shaft 2 so that it is freely rotatable.

The above output shaft 2 is hallow inside and a front end of an input shaft 4 is rotatably inserted into the proximal end. The input shaft 4 and the output shaft 2 are connected to each other through a torsion bar 5. That is, an end of the torsion bar 5 is inserted into the input shaft 4 and fixed to the input shaft 4 by means of a pin 6 inserted through an insertion portion thereof. The other end of the torsion bar 5 is fixed to the output shaft 2 by a pin (not shown).

Thus, the input shaft 4 and the output shaft 2 can be rotated relative to each other such that the torsion bar 5 is twisted. This torsion bar 5 functions in completely the same manner as conventionally. Thus, a description of that function is omitted.

The input shaft 4 and the output shaft 2 compose steering valve v. That is, of the input shaft 4, an external circumference of a portion thereof inserted into the output shaft 2 is called rotary spool 7 and an internal circumference of the output shaft 2 facing this rotary spool 7 is called rotary spool 8.

Accompanied by relative rotations of the input shaft 4 and the output shaft 2, this steering valve v is switched over so as to supply a pressurized oil to a pressure chamber of the above power cylinder 1 and then introduce hydraulic oil of the other pressure chamber to a tank.

A sealing member 9 is provided outward of the above steering valve v and a spring storing chamber 10 is formed further outward of this sealing member and at an end portion of the output shaft 2. The spring storing chamber 10 is, as shown in FIG. 2, formed by excavating the end portion of the output shaft 2 in a square shape.

On both sides of the input shaft 4 located in the spring storing chamber 10, flat surfaces 12, 12 are formed on opposing wall faces 11, 11 of the spring storing chamber 10. When the steering wheel (not shown) is located in its neutral position, the wall faces 11, 11 and the flat surfaces 12, 12 are maintained so as to be parallel to each other.

Figure 2:
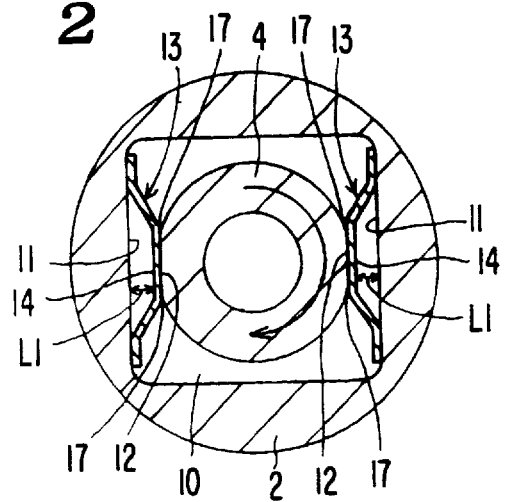
FIG. 2 is a sectional view of a state in which spring members are incorporated in a spring storing chamber of a first embodiment.

As shown in the FIG. 2, spring members 13, 13 are disposed between the wall faces 11, 11 and the flat surfaces 12, 12.

Figure 3:
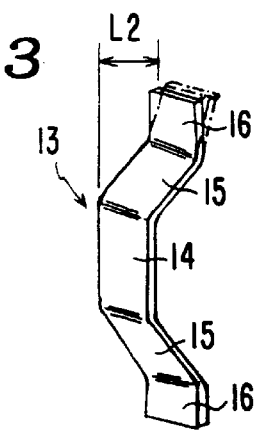
FIG. 3 is a perspective view of a spring member of the first embodiment.
Figure 4:
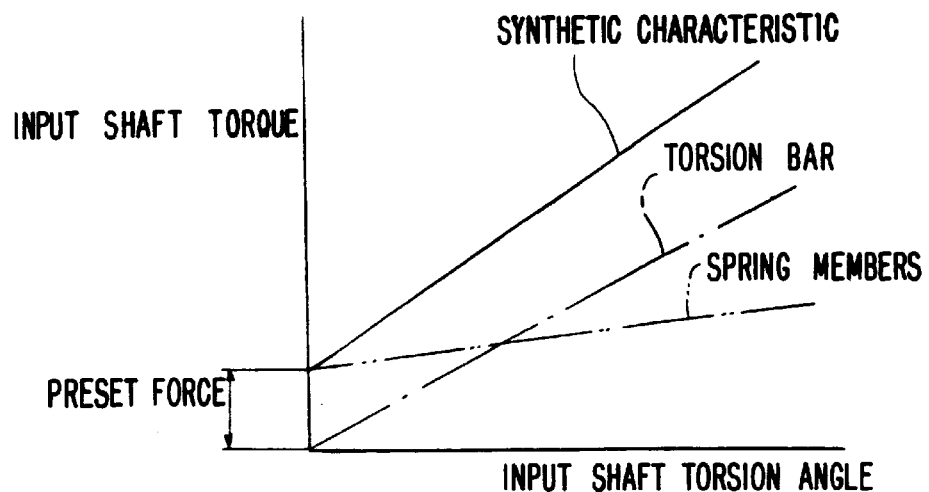
FIG. 4 is a graph indicating the spring characteristic of the first embodiment.

As shown in FIG. 3, these spring members 13, 13 are made of a leaf spring having a substantially trapezoidal cross section and have a flat top portion 14. Further, At further ends of oblique faces 15, 15 on both sides of this flat top portion 14 are formed flat portions 16, 16.

When the spring members 13, 13 are not incorporated in the spring storing chamber 10, the flat portions 16, 16 are formed slightly obliquely with respect to the flat top portion 14 as indicated by dotted lines in FIG. 3.

Assuming a distance $L_1$ which exists between the flat surfaces 12, 12 of the input shaft 4 and the wall faces 11, 11 of the spring storing chamber 10, a distance $L_2$ between the flat top portion 14 of the spring member 13, 13 in free state and the flat portion 16, 16 is larger.

If this spring members 13, 13 are incorporated in between the flat surfaces 12, 12 of the input shaft 4 and the wall faces 11, 11 of the spring storing chamber 10, because the relation $L_1 < L_2$ is provided as described above, an initial load resulting from a fact that the $L_2$ is compressed to $L_1$ occurs in the spring members 13, 13. This initial load acts as a preset force shown in FIG. 4.

If the input shaft 4 is rotated from the neutral position shown in FIG. 2, ridge lines 17, 17 formed on a border between the flat surfaces 12, 12 and the other circumferential surface act as an action point so as to exert a force in a direction of crushing the spring members 13, 13. A force resisting to the force acting on this spring members 13, 13 is called spring characteristic. This spring characteristic is shown by two dots and dash line in FIG. 4.

An operation of the first embodiment will be described below.

Now if the steering wheel is maintained at its neutral position, the input shaft 4 and the output shaft 2 are maintained in a state shown in FIG. 2. Because the initial load of the spring members 13, 13 or the preset force acts on the input shaft 4, the neutral rigidity is increased correspondingly so that stability of operation at time of a straight traveling is secured.

If the input shaft 4 is rotated, for example, in a direction of a arrow shown in FIG. 2 by turning the steering wheel, of the ridge lines 17, 17 formed on the border between the flat surface 12 and the other face, a ridge line in the back position of the rotation direction acts as an acting point so as to exert a force in the direction of crushing the spring members 13, 13.

Therefore, a reactive force of steering at this time is composed of a torsion force in the torsion bar 5 and a spring force in the spring member 13. One dot and dash line in FIG. 4 indicates a spring characteristic of the torsion bar and a solid line indicates a synthetic characteristic of the torsion bar 5 and the spring member 13.

In the first embodiment described above, the neutral rigidity is improved as compared to a case of only the torsion bar 5 and further right and left balance is easy to take because the spring members 13, 13 are made to pressure-fit to both sides of the input shaft 4.

Because the right and left balance is improved, there is not such a problem in which the reactive force of steering differs between the right and the left, and assembly performance is improved and no looseness occurs.

Further, if a rotation-direction length of the flat surface 12, 12 formed on the input shaft 4 is adjusted, the spring force of the spring member 13, 13 can be adjusted easily.

Figure 5:
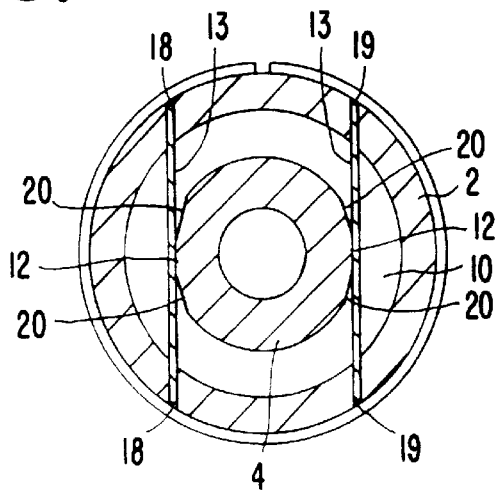
FIG. 5 is a sectional view of a state in which spring members are incorporated in the spring storing chamber of the second embodiment.
Figure 6:
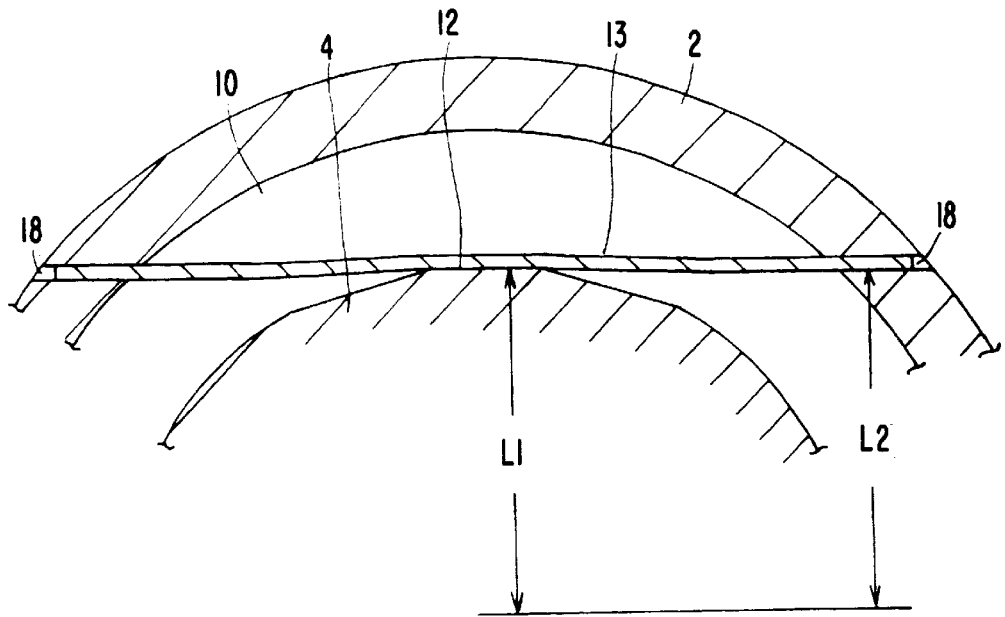
FIG. 6 is a sectional view indicating in enlargement a state in which the spring member is pressure fit according to the second embodiment.

In the second embodiment shown in FIGS. 5, 6, flat leaf springs are bridged in the spring storing chamber 10 formed at an end of the output shaft 2 so that the leaf springs serve as the spring member 13, 13. The spring members 13, 13 are incorporated in the spring storing chamber 10 in a structure described below.

That is, two pairs of slit grooves are formed in the spring storing chamber 10. Then, a pair of the slit grooves 18, 18 are made to oppose each other on one side of the input shaft 4 and the other pair of the slit grooves 19, 19 are made to oppose each other on the other side of the input shaft 4. Then both ends of the spring members 13, 13 are inserted into the slit grooves 18, 18 and 19, 19 to bridge the spring members in the spring storing chamber 10.

When the spring members 13, 13 are incorporated as described above, side faces thereof are made to contact the flat surfaces 12, 12 formed on the input shaft 4. That is, as compared to a distance $L_1$ between a center of the input shaft 4 and the flat surface 12, 12 as shown in FIG. 6, the other distance $L_2$ between the center of the shaft and the slit groove 18, 19 is set to be slightly smaller. By this relation $L_1 > L_2$, an initial load can be maintained in the spring members 13. As described above, the spring members 13, 13 are made to contact the flat surfaces 12, 12, according to the second embodiment, contacting portions of the spring members 13, 13 are flat portions of the spring members 13, 13.

According to the second embodiment, oblique faces 20, 20 are formed on both sides of the flat surfaces 12, 12 on the input shaft 4. These oblique faces 20, 20 prevent portions other than the ridge lines from being in contact with the spring members 13, 13 when the input shaft 4 is rotated. Thus, if the oblique faces 15, 15 are formed in the spring member itself like in the first embodiment, it is not necessary to form the oblique faces on the input shaft 4. Meanwhile, even if the oblique faces are formed on both sides of the flat surface in the first embodiment, it is apparent that there is no problem.

Figure 7:
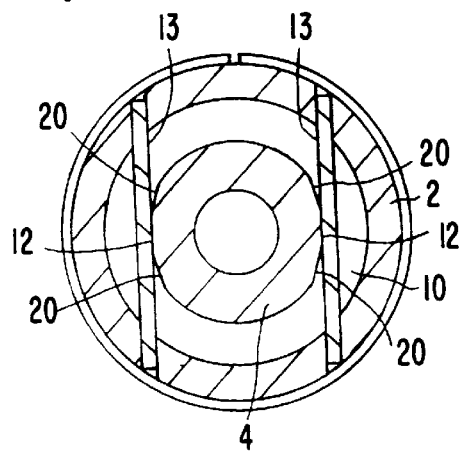
FIG. 7 is a sectional view of a state in which the spring members are incorporated in the spring storing chamber of the third embodiment.

In a third embodiment shown in FIG. 7, the spring members 13, 13 made of wires such as piano wires are used instead of the leaf springs used in the second embodiment. The other structure is the same as the second embodiment. That is, insertion holes are formed in the spring storing chamber 10 and the spring members are inserted in this insertion holes.

Because the spring storing chamber 10 can be maintained in a circular shape in the second and third embodiments, the production is made easier.

Figure 8:
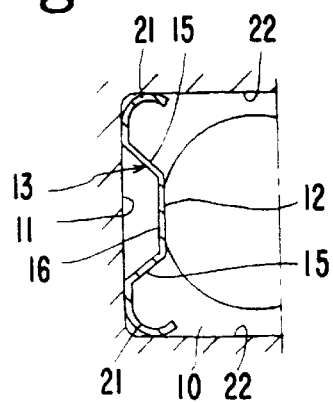
FIG. 8 is a sectional view of a state in which the spring members are incorporated in the spring storing chamber of the fourth embodiment.

In a fourth embodiment shown in FIG. 8, the spring members 13 having trapezoidal cross section are utilized like in the first embodiment. The spring members 13 of the third embodiment are different from the first embodiment in that both ends thereof are curled. By forming the curled portions 21, 21 on both ends of the spring member 13, the curled portions 21, 21 contact the wall faces 22, 22 perpendicular to the wall faces 11, 11 of the spring storing chamber. Thus, elasticity of the spring member 13 can be maintained and the position of the spring member 13 can be secured.

Figure 9:
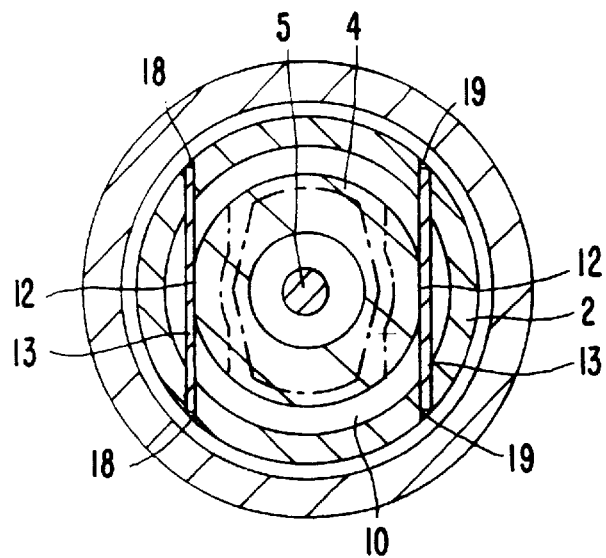
FIG. 9 is a sectional view of a state in which the spring members are incorporated in the spring storing chamber of the fifth embodiment.

In a fifth embodiment shown in FIG. 9, an end portion of the input shaft 4 is configured in a different shape from the other portions. The other structure is the same as the second embodiment and flat leaf springs are utilized as the spring members 13.

Figure 10:
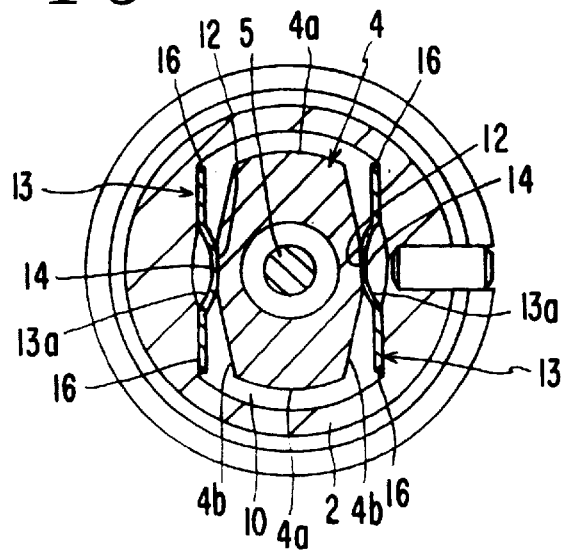
FIG. 10 is a sectional view of a state in which the spring members are incorporated in the spring storing chamber of the sixth embodiment.

In a sixth embodiment shown in FIG. 10, a spring force of the spring members 13, 13 is applied to portions corresponding to the end portion of the input shaft 4 according to the fifth embodiment. That is, as for a sectional shape of the input shaft 4 inserted into the spring storing chamber 10, both ends thereof are circular portions 4a, 4a and planes 4b, 4b connecting these circular portions 4b, 4b are swollen in a mountainous shape. And flat faces 12, 12 are formed on top of these planes 4b, 4b.

On the other hand, the spring members 13 utilize leaf springs and have swollen portions 13a, 13a in the center portion thereof. And flat portions are formed on the swollen portions 13a, 13a.

Therefore, in the sixth embodiment also, the same operation and advantage as the above respective embodiments can be attained.

Figure 11:
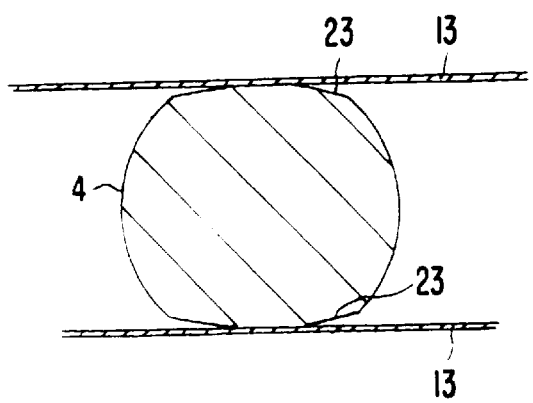
FIG. 11 is an explanatory diagram indicating a relation between the input shaft and the spring member of the seventh embodiment.

In the seventh embodiment shown in FIG. 11, curved faces 23, 23 are formed on the input shaft 4 instead of the flat faces of the above respective examples. The curved faces 23, 23 are so formed that the curvature radius is larger than the curvature radius of the other circumferential faces of the input shaft 4. Therefore if the input shaft 4 is rotated, the spring members 13 are bent by the curved faces 23, 23. This point is the same as in the second embodiment.

Figure 12:
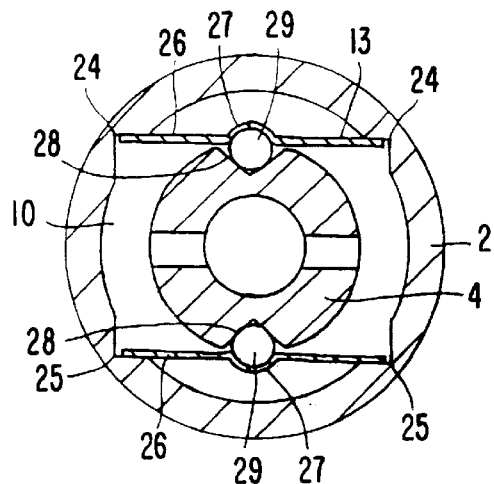
FIG. 12 is a sectional view of a state in which detente mechanism is incorporated in a storing chamber of an eighth embodiment.

In an eighth embodiment shown in FIG. 12, a detente mechanism is utilized to enhance the neutral rigidity.

That is, two pairs of hook stopper steps are formed in the storing chamber 10 formed in the output shaft 2. Then, a pair of the hook stopper steps 24, 24 are formed so as to oppose each other on one side of the input shaft 4 and the other pair of the hook stopper steps 25, 25 are formed so as to oppose each other on the other side of the input shaft 4. Leaf springs 26, 26 are bridged in the storing chamber 10 by hooking both ends of the leaf springs 26, 26 in the hook stopper steps 24, 24 and 25, 25.

Concave portions 27, 27 are formed on a side face opposing the input shaft 4, of the leaf spring 26, 26. Further, V-grooves 28, 28 are formed in the input shaft also such that when the steering wheel is in its neutral position, the concave portions 27, 27 oppose the V-grooves 28, 28.

Balls or rollers 29, 29 are disposed in gaps between the above concave portions 27, 27 and the V-grooves 28, 28.

In the eighth embodiment having such a structure, for the input shaft 4 to rotate relative to the output shaft 2, the balls or the rollers 29, 29 must be raised as well as the leaf springs 26, 26. A deflecting force for raising these leaf springs 26, 26 act as a reaction of steering.

Thus, in the eighth embodiment also, the same operation and advantage as the above respective embodiments can be expected.

Meantime, in the eighth embodiment, the concave portions 27, the balls or rollers 29 and the V-shaped grooves 28 compose the detente mechanism.

Figure 13:
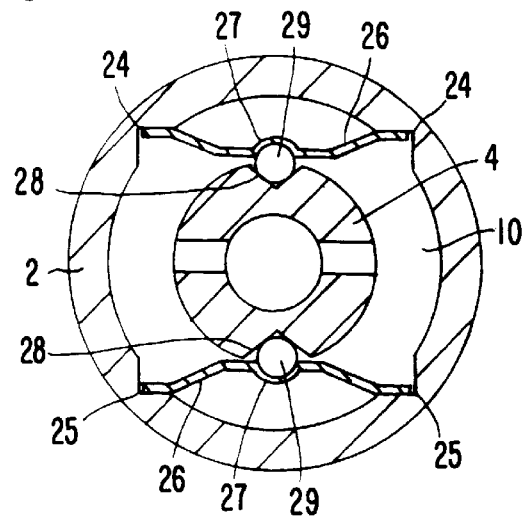
FIG. 13 is a sectional view of a state in which detente mechanism is incorporated in a storing chamber of a ninth embodiment.

According to a ninth embodiment shown in FIG. 13, the leaf springs 26, 26 have a trapezoidal cross section and circular shaped concave portions 27, 27 are formed on top thereof. The other structures are the same as the seventh embodiment.

Figure 14:
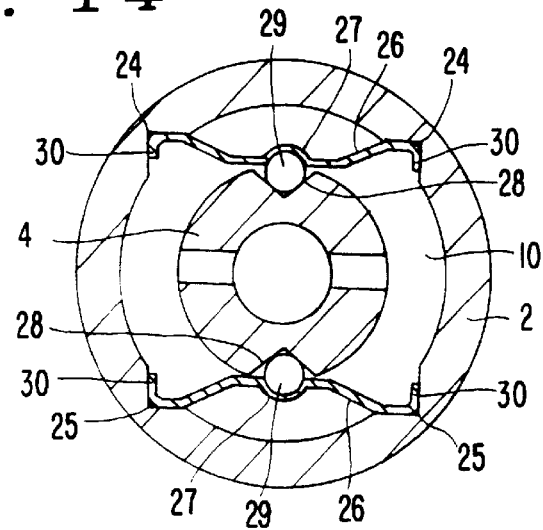
FIG. 14 is a sectional view of a state in which detente mechanism is incorporated in a spring storing chamber of a tenth embodiment.

According to a tenth embodiment shown in FIG. 14, hook portions 30, 30 which are bent toward inside relative to both ends of the leaf springs are formed on both ends of the leaf springs 26, 26. This hook portion 30, 30 is secured by the hook stopper step 24, 24.

Because the hook portions 30, 30 are secured by the hook stopper steps 24, 24, the hook portions 30, 30 are entirely in contact with the steps 24, 24 so that the leaf springs 26, 26 can be held in a stable condition.

Figure 15:
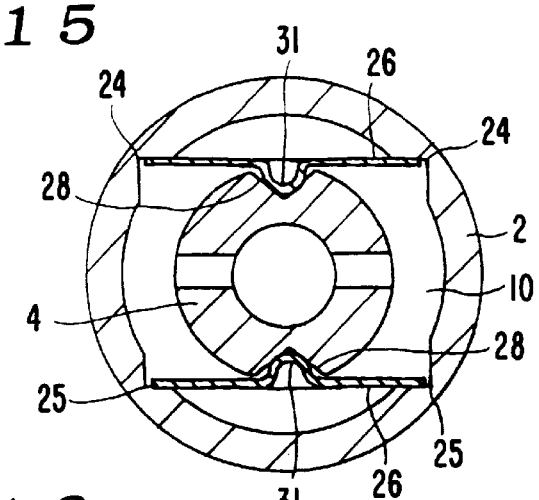
FIG. 15 is a sectional view of a state in which detente mechanism is incorporated in a spring storing chamber of an eleventh embodiment.

According to an eleventh embodiment shown in FIG. 15, convex portions 31, 31 are formed directly in the leaf springs 26, 26 such that the convex portions 31, 31 coincide with the V-grooves 28, 28 in the input shaft 4. The other structure is the same as the eighth embodiment.

Figure 16:
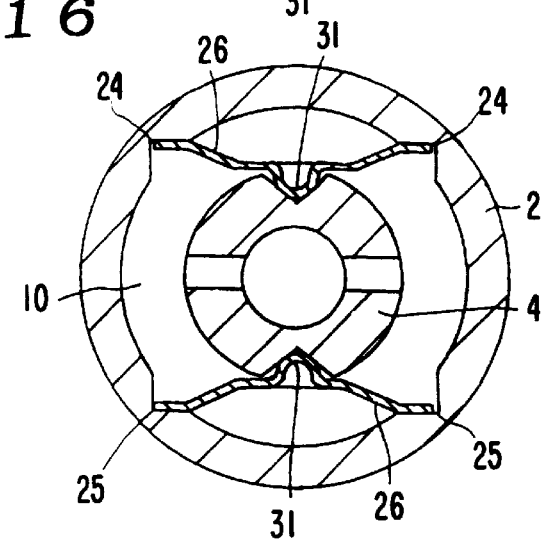
FIG. 16 is a sectional view of a state in which detente mechanism is incorporated in a spring storing chamber of a twelfth embodiment.

According to a twelfth embodiment shown in FIG. 16, sectional shapes of the leaf springs 26, 26 are formed in substantially trapezoidal shape and convex portions 31, 31 are formed on top thereof. The other structure is the same as the ninth embodiment.

Figure 17:
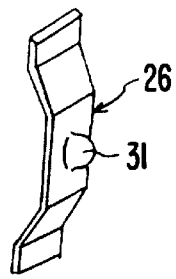
FIG. 17 is a perspective view of the spring member of the twelfth embodiment.
Figure 18:
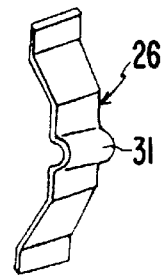
FIG. 18 is a perspective view of the spring member having anther form of the twelfth embodiment.

In the above eleventh and twelfth embodiments, the protrusions 31, 31 may be spherical protrusions shown in FIG. 17 or cylindrical protrusion shown in FIG. 18.

Although in the above respective embodiments, the spring storing chamber 10 is formed in the output shaft 2, the present invention is not restricted to this structure. If the output shaft and the rotary sleeve of the steering valve v are separated and they are mechanically connected, it is permissible to form the storing chamber 10 in the steering valve v side. In any cases, an intention of the present invention is attained if the storing chamber is formed in the output shaft or a member rotating integrally therewith and the input shaft is inserted into this storing chamber such that they are rotated relative to each other.

Figure 19:
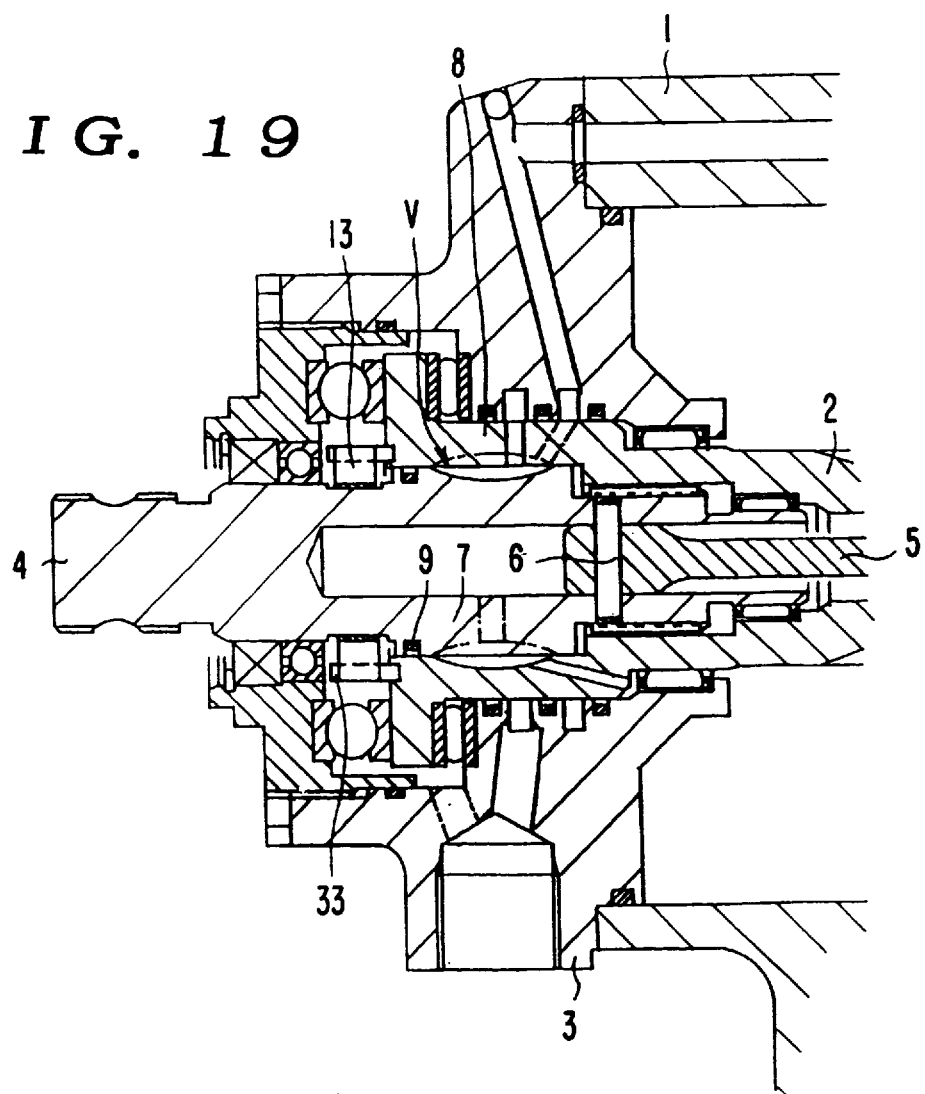
FIG. 19 is a sectional view of major parts of a thirteenth embodiment.
Figure 20:
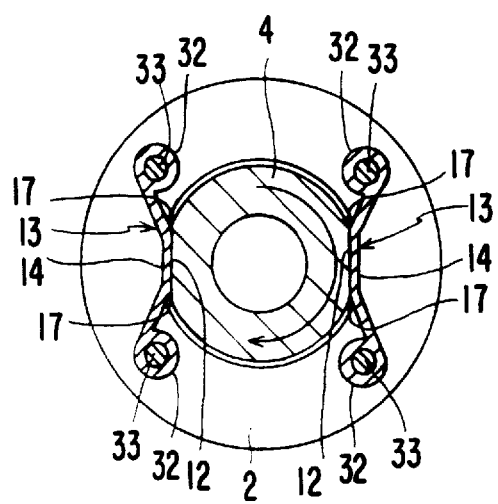
FIG. 20 is a view showing a spring member mounting state according to the thirteenth embodiment.

In the thirteenth embodiment shown in FIGS. 19, 20, the spring members 13 are fixed to the ends of the output shaft 2 by means of the pins 33, 33.

Although this point is different from the first embodiment, the mechanism for applying the preset force by means of a pair of the spring members 13 is the same as the first embodiment.

Then, a method for fixing the spring members 13 according to the thirteenth embodiment is as follows.

First as shown in FIG. 20, both ends of the spring members 13 are curled so as to form fixing portions 32, 32. Then the pins 33, 33 are fixed to end faces of the output shaft 2 and the fixing portions 32, 32 are hooked on the pins 33, 33. Here the pins 33, 33 are fixing means whose positions are not movable.

Because both ends of the spring members 13 are fixed by the pins 33, 33, even when the spring members 13 are deformed by relative rotations of the input shaft 4 and the output shaft 2, the spring members 13 are not deviated. Because both ends of the spring members are not moved, the neutral rigidity can be intensified.

Although the spring storing chamber is not formed in this embodiment, it is permissible to form the spring storing chamber and fix the spring members 13 on the output shaft 2 by means of a fixing means such as a pin.

Although the embodiments in which the hydraulic power steering apparatus is utilized have been described above, an electric driven power steering apparatus can be also provided with the same preset force applying mechanism.

Figure 21:
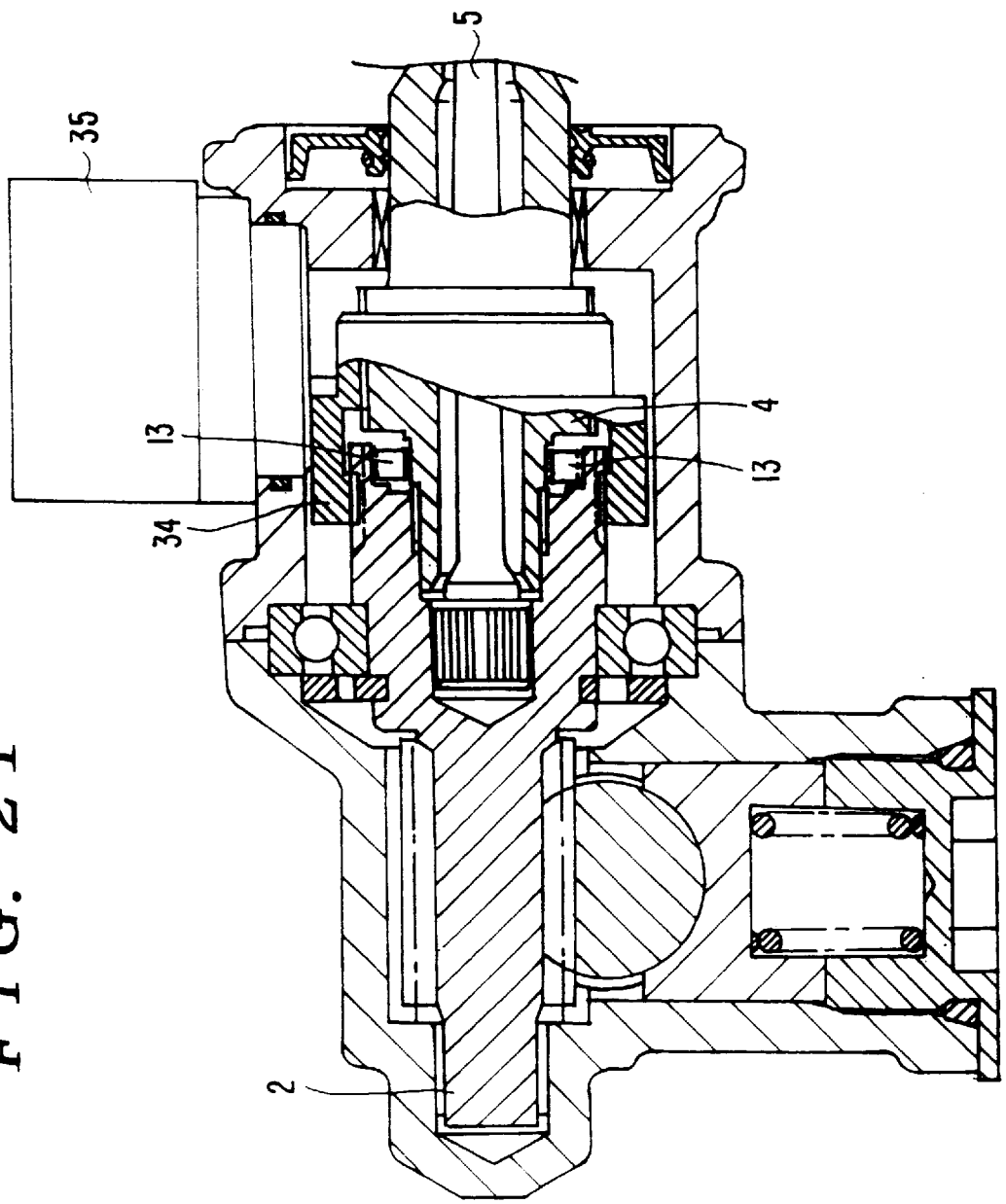
FIG. 21 is a sectional view of major parts of a fourteenth embodiment.

A fourteenth embodiment thereof shown in FIG. 21 is an electric driven power steering apparatus for generating an assist force by means of an electric motor (not shown) depending on a magnitude and direction of the input torque.

According to the fourteenth embodiment, when the input shaft 4 and the output shaft 2 are rotated relative to each other, the slider 34 provided on an external circumference of the output shaft 2 and the input shaft 4 is moved in the axial direction and a torque sensor 35 detects an input torque according to an amount of this moving. Although the above slider 34 is connected to the output shaft 2 by screws, a guide for restricting it from being moved in rotation direction so as to allow a moving in the axial direction is provided.

A mechanism for applying the preset force by means of the spring members 13 provided so as to sandwich the input shaft 4 is the same as the first embodiment. However, all the preset force applying mechanisms of the first–thirteenth embodiment as well as of the first embodiment can be provided on the electric driven power steering apparatus.

Further, the method for detecting the input torque is not restricted to the above methods. For example, there is also a method of providing the torsion bar 5 with a distortion gauge and converting detected values to input torque.

In the power steering apparatus according to the present invention, because a pair of the spring members are provided so as to firmly contact both sides of the input shaft, the right and left balance is attained by the spring force. Thus, steering resistances of the right and left sides become equal and there is provided a mechanism in which looseness is not likely to be produced.

By disposing the spring members between the wall faces of the storing chamber formed in the output shaft and both surfaces of the input shaft inserted into this storing chamber, such a conventional problem that the spring force is difficult to specify can be solved. Even if the preset force is set large or small, such a case in which the fitting performance thereof is affected is eliminated.

Because both ends of the spring members are fixed not so as to move according to the fourteenth embodiment, it is possible to prevent the spring members from being loose.

What is claimed is:

1. A power steering apparatus comprising an input shaft connected to a steering wheel side, an output shaft connected to wheels to be steered and a torsion bar connecting said input shaft and said output shaft and making said input shaft and said output shaft rotate relative to each other while twisting said torsion bar so as to apply an assist force corresponding to an amount of the relative rotation, wherein a pair of spring members which sandwich both sides of said input shaft are disposed within said output shaft or a member rotating integrally with said output shaft so as to exert a preset force by means of spring force of the spring members.

2. A power steering apparatus according to claim 1 wherein flat faces are formed on both sides of said input shaft and flat portions are formed on said spring members corresponding to said flat faces of said input shaft such that said flat faces and said flat portions are firmly in contact with each other.

3. A power steering apparatus according to claim 2 wherein oblique faces are formed on both sides of said flat faces of said input shaft.

4. A power steering apparatus according to claim 2 wherein said spring members comprise leaf springs the central portion of which is swollen toward the input shaft side.

5. A power steering apparatus according to claim 1 wherein curved faces having a curvature radius larger than other circumferences thereof are formed on said input shaft while said spring members are made into a firm contact with said curved faces.

6. A power steering apparatus according to claim 1 wherein a spring storing chamber is defined in the output shaft or a member rotating integrally with said output shaft the input shaft being situated in said spring storing chamber and spring members are disposed in gaps between both ends of said input shaft and wall faces of said spring storing chamber.

7. A power steering apparatus according to claim 6 wherein said spring members comprise flat leaf springs and both ends of the leaf springs are inserted into slit grooves formed in wall face of the spring storing chamber so that said leaf springs are firmly in contact with both sides of said input shaft.

8. A power steering apparatus according to claim 6 wherein said spring members comprise wire material and both ends of said wire material are inserted into insertion holes defined in the wall faces of the spring storing chamber so that said wire material is firmly in contact with both sides of said input shaft.

9. A power steering apparatus according to claim 6 wherein said spring members comprise leaf springs having a trapezoidal cross section and flat portions are formed on top thereof so that both end portions thereof are firmly in contact with the wall faces of the spring storing chamber.

10. A power steering apparatus according to claim 9 wherein both ends of said leaf springs are curled and the curled portions are firmly in contact with corners in the spring storing chamber.

11. A power steering apparatus according to claim 1 further comprising a detente mechanism provided between the spring member and input shaft, said detente mechanism being so structured that a protrusion provided on said spring member coincides with a groove formed in said input shaft in the neutral position.

12. A power steering apparatus according to claim 11 wherein balls or roller are held in the spring members, said balls or said rollers composing protrusions.

13. A power steering apparatus according to claim 11 wherein the spring storing chamber is formed in the output shaft or a member rotating integrally with said output shaft and hooking portions are provided on both ends of said spring members such that said hooking portions are made into a firm contact with corner portions of the spring storing chamber.

14. A power steering apparatus according to claim 1 wherein fixing portions are formed at both ends of the spring members and said fixing portions are fixed to said output shaft or the member rotating integrally with said output shaft by means of said fixing means.

* * * * *